United States Patent [19]

Schoonover et al.

[11] 3,934,185
[45] Jan. 20, 1976

[54] MACHINE TOOL CONTROL SYSTEM

[75] Inventors: Stanley C. Schoonover; Harrel, Jack D., both of Waynesboro, Pa.

[73] Assignee: Landis Tool Company, Waynesboro, Pa.

[22] Filed: May 30, 1974

[21] Appl. No.: 474,553

Related U.S. Application Data

[63] Continuation of Ser. No. 322,468, Jan. 10, 1973, abandoned.

[52] U.S. Cl. ............... 318/565; 318/571; 318/603; 318/696
[51] Int. Cl.² ................. G05B 23/00; G05B 19/00
[58] Field of Search ......... 318/565, 571, 603, 696; 51/165.8

[56] References Cited
UNITED STATES PATENTS

| | | | |
|---|---|---|---|
| 3,411,058 | 11/1968 | Masden et al. | 318/696 |
| 3,557,495 | 1/1972 | Price | 51/165.8 |
| 3,576,979 | 5/1971 | McCall et al. | 318/565 X |
| 3,582,751 | 6/1971 | Rosshirt | 318/696 |
| 3,633,087 | 1/1972 | Vawter | 318/565 |
| 3,646,419 | 2/1972 | Holy et al. | 318/603 |
| 3,691,357 | 9/1972 | McIntosh | 318/571 X |
| 3,698,138 | 10/1972 | Wada et al. | 51/165.8 |

*Primary Examiner*—James R. Scott
*Attorney, Agent, or Firm*—Spencer T. Smith

[57] ABSTRACT

A machine tool control system moves a grinding wheel from a retracted position to a forward position by causing hydraulic fluid to be applied under pressure to a hydraulic cylinder to effect rapid forward movement of the grinding wheel to a forward position whereupon further movement of the grinding wheel to a final position is effected by supplying a predetermined number of pulses to a stepping motor for driving the feed screw in accordance with a predetermined sequence of grinding movements. Upon completion of the grinding operation, the grinding wheel is reset to the initial retracted position by applying hydraulic fluid to another portion of a cylinder to rapidly move the grinding wheel from the forward position to the retracted position while at the same time applying the same predetermined number of pulses to the stepping motor so as to reversely rotate the feed screw to return the grinding wheel to the initial position. To confirm an accurate resetting of the grinding wheel within an acceptable margin of error, a pulse generator operated by the actual movement of the feed screw produces verification pulses which are received by a reset confirmation circuit which at the conclusion of the resetting operation monitors a number of pulses corresponding to the acceptable margin of error to determine whether the grinding wheel has been reset to the initial position. If the reset confirmation circuit receives an insufficient number of verification pulses, indicating an underreset condition, or receives too many pulses within a period of time corresponding to the acceptable margin of error, indicating an overreset condition, then further operation of the machine tool will be prevented.

3 Claims, 1 Drawing Figure

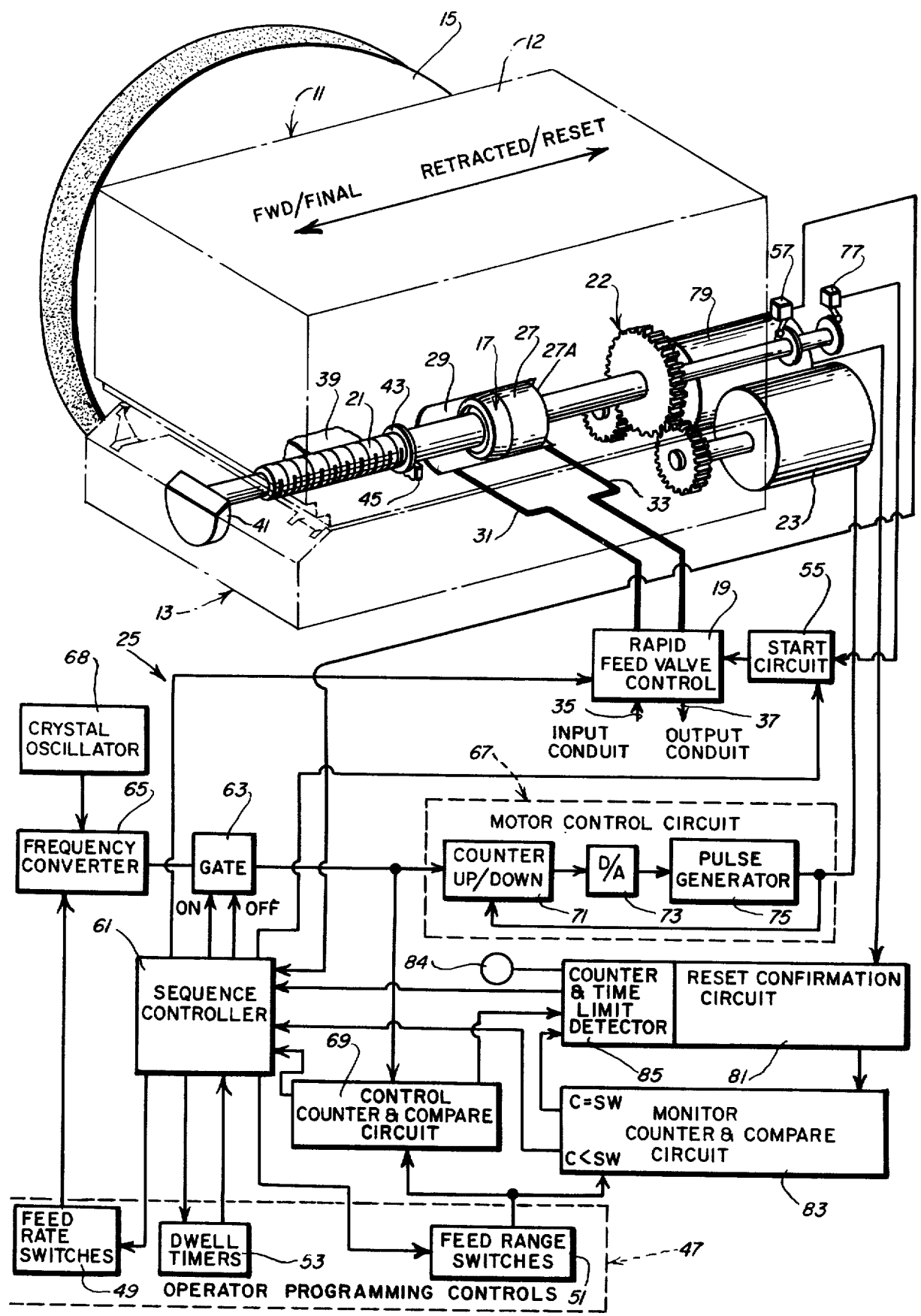

MACHINE TOOL CONTROL SYSTEM

This is a continuation of copending U.S. Application Ser. No. 322,468, filed Jan. 10, 1973, now abandoned.

This invention relates to a control system for a machine tool, for example a grinding machine, in which a grinding wheel is advanced from an initial starting position to a final position in accordance with pulses representative of a given distance to effect grinding of a workpiece to a desired size, and more particularly to a control system for accurately confirming a proper resetting of the grinding wheel to the initial starting position by monitoring pulses produced during the resetting operation.

In operating a grinding machine, a workpiece is loaded into a suitable support mechanism on the machine while the grinding wheel is at a rest or retracted position, and then the grinding wheel is advanced into engagement with the workpiece and to a final position to grind the workpiece to a final desired size. Subsequently, the grinding wheel is removed to the retracted position to enable another workpiece to be loaded into the grinding machine. To minimize the amount of time necessary to grind a workpiece to a desired size, it is desirable to move the grinding wheel rapidly from the retracted position to a forward position closely adjacent the workpiece whereupon the grinding wheel may be advanced at a slower rate in accordance with a sequence of grinding movements. However, unless the grinding wheel is fully returned to the initial starting position, then the grinding wheel may be brought into contact with the workpiece during the above-mentioned rapid movement, resulting in damage to the workpiece and possible injury to an operator. Alternatively, if the grinding wheel is reset beyond the initial starting position, then the next workpiece will not be ground to a final desired size. Accordingly, an object of the present invention is to provide a control system for a machine tool moved between an initial starting position to a final position in accordance with pulses representative of distance with means for confirming a correct resetting of the machine tool to the starting position.

Still other objects, features and advantages of the present invention will become apparent to those skilled in the art from a reading of the following detailed description of a preferred embodiment of the invention, taken in conjunction with the accompanying drawing, wherein:

The FIGURE is a diagrammatic view of a grinding machine illustrating the drive mechanism and a schematic block diagram of a control circuit for operating the drive mechanism.

Referring now in detail to the FIGURE in the drawing, there is shown diagrammatically a grinding machine, generally indicated 11, for grinding a workpiece, not shown, to a selected size. Although not shown, the workpiece may be supported in a conventional manner between a head stock and a tail stock of a work support mounted at one end of a bed 13 of the grinding machine 11. Also mounted on the bed 13 is a rotatably driven grinding wheel 15 which is carried by a wheel base 12 which is slidably supported on the bed 13 for movement relative to the workpiece. To grind the workpiece to a selected size, the grinding wheel 15 is moved from a retracted position to a forward position by a rapid hydraulic feed arrangement, generally indicated 17, which is controlled by a rapid feed valve controller 19. Upon reaching the forward position, the grinding wheel 15 is further advanced at a slower rate toward a final position by a feed screw 21 which is rotatably driven through a gear drive, generally indicated 22, by an electric motor 23 which is controlled by a grinding control circuit, generally indicated at 25. Upon grinding the workpiece to a selected size as determined by the final position to which the grinding wheel 15 is advanced, the grinding wheel 15 is then removed from the workpiece by reversely driving the feed screw 21 to move the wheel base 12 to a reset position and by operating the rapid feed valve controller 19 to drive the wheel base 12 from the forward position to the retracted position.

As shown, the rapid hydraulic feed arrangement 17 is in the form of a piston 27 slidably disposed in the cylinder 29 which is formed in the bed 13 of the grinding machine 11 for moving the wheel base 12 between the retracted position and the forward position. The hydraulic feed arrangement 17 includes a pair of hydraulic conduits 31, 33 each leading from different openings at the opposite ends of the cylinder 29 to the rapid feed valve controller 19 for controlling the flow of hydraulic fluid to the cylinder 29. The rapid feed valve controller 19 may be in the form of a conventional solenoid-controlled valve having input and output conduits 35, 37 respectively, leading to a supply of hydraulic fluid, not shown, in a conventional manner. The piston 27 is secured to the feed screw 21 which threadably engages a half nut 39 associated with the wheel base 12 for moving the grinding wheel 15 relative to the bed 13 of the grinding machine 11. When the rapid feed valve controller 19 is operated to move the grinding wheel 15 from the retracted position to the forward position, hydraulic fluid is supplied through the conduit 33 to the rearward end of the cylinder 29 so as to push the piston 27 forwardly until the end of the feed screw 21 abuts against a forward stop 41. To move the wheel base 12 from the forward position to the retracted position, the rapid feed valve controller 19 is operated to supply hydraulic fluid through the conduit 31 to the forward end of the cylinder 29 to push the piston 27 rearwardly until a collar 43 on the feed screw 21 abuts a rearward stop 45. The manner of supplying hydraulic fluid to the rapid feed valve controller 19 and the means by which the rapid feed valve controller 19 operates to control the flow of fluid to the cylinder 29 are not shown since they form no part of the present invention and may be desirably conventional.

In grinding the workpiece to a final selected size, the grinding wheel 15 is typically advanced from the forward position to the final position in a sequence of grinding movements in which the grinding wheel is advanced at a much slower rate than the rapid feed rate by which the grinding wheel moved from the retracted position to the forward position. As more particularly described in copending U.S. Pat. No. 3,716,949, the grinding wheel 15 is advanced over a preselected range at a preselected rate until reaching the end point of the selected range whereupon there is a predetermined dwell period before beginning the next grinding movement, and there may be several sequences of grinding movements with different feed ranges, different feed rates and different dwell periods until the workpiece is finally ground to the selected size when the grinding wheel 15 reaches the final position. At the final position, there is a dwell period commonly referred to as the "spark out" period, and upon completion of the "spark out" period the grinding wheel 15 may be withdrawn from the workpiece to a reset position.

To advance the grinding wheel 15 from the forward position to the final position, the feed screw 21 is rotatably driven by the motor 23, which may be a suitable electric stepping motor, and which is operated in accordance with pulses supplied from the grinding control circuit generally indicated at 25, with each pulse being representative of a predetermined feed distance or degree of rotation of the feed screw 21. To enable an operator to establish a program of grinding movements, the grinding control circuit 25 includes operator programming controls, generally indicated at 47 which consist of feed rate switches 49, feed range switches 51, and dwell timers 53 which may be individually set by the operator. The feed range switches 51 determine the total number of pulses to be supplied to the electric stepping motor 23 and thereby define the distance over which the grinding wheel 15 is advanced, the feed rate switches 49 determine the rate at which the selected number of pulses are supplied to the motor 23, and the dwell timers 53 determine the amount of time that the grinding wheel 15 will remain at the end point of a corresponding feed range before undergoing further movement. The details of the movement of the grinding wheel 15 during a grinding operation, and the details the feed range switches 51, the feed rate switches 49 and the dwell timers 53 are not described since they are adequately explained in the above mentioned copending U.S. Pat. No. 3,716,949, to which reference may be made for additional details of the involved grinding control circuit 25.

To initiate the operation of the grinding machine 11, a suitable start switch 55 may be actuated to supply a start signal to the rapid feed valve controller 19 so as to cause hydraulic fluid to be supplied to the rearward end of the cylinder 29 to move the grinding wheel 15 from the retracted position to the forward position whereupon the end of the feed screw 21 abuts against the forward stop 41. Upon reaching the forward stop 41, a limit switch 57 is operated by a projection 59 associated with the feed screw 21 so as to provide a signal to initiate the operation of the grinding control circuit 25. The signal from the limit switch 57 is supplied to a sequence controller 61 which supplies an ON signal to a gate 63 to enable pulses to pass from a frequency converter 65 to a motor control circuit, generally indicated 67 for driving the stepping motor 23. At the same time, the sequence controller 61 supplies operating signals to the feed rate switch 49 and the feed range switch 51 determining the first grinding sequence. The feed rate switch 49 actuates the frequency converter 65 which receives signals from a crystal controlled oscillator 68 and produces a series of pulses at the rate determined by the selected feed rate switch 49. The feed range switch 51 supplies a signal to a control counter and compare circuit 69 which receives the same pulses being supplied to the motor control circuit 67. The signal supplied by the selected feed range switch 51 is representative of the total number of pulses to be supplied to the motor control circuit 67 during the selected sequence of grinding movement, and when the control counter and compare circuit 69 has counted the selected number of pulses, it supplies a signal to the sequence controller 61 which in turn supplies an OFF signal to the gate 63 to stop the series of pulses being supplied to the motor control circuit 67. At the same time the sequence controller 61 initiates the operation of the dwell timer 53 associated with the first grinding sequence. Upon completion of the operation of the selected dwell timer 53, the timer 53, actuates the sequence controller 61 to initiate another grinding operation.

As the pulses from the frequency converter 65 are supplied to the motor control circuit 67, the pulses are received by a suitable up/down counter 71 which counts the incoming pulses and produces a digital signal representative of the total incoming pulses received by the counter. The digital signal produced by the counter 71 is received by a suitable digital to analogue converter 73 which supplies an analogue signal of corresponding magnitude to a suitable pulse generator 75 which supplies pulses to the stepping motor 23 at a frequency rate dependent upon the magnitude of the analogue signal. Although not shown, the pulse generator 75 may be in the form of a suitable unijunction transistor relaxation oscillator in which the emitter of the unijunction transistor is connected to a junction between a series-connected resistor-capacitor(RC) timing circuit. The analogue signal is applied across the RC timing circuit and the capacitor is charged at a rate determined by the magnitude of the analogue signal and the series resistance until the emitter break-over voltage is reached, whereupon the capacitor is discharged through the emitter of the unijunction transistor producing a pulse supplied to the stepping motor. As the pulse generator 75 supplies pulses to the motor 23, the same pulses are fed back to the counter 71 to reduce the total pulse count. Since the pulse generator 75 initially produces pulses at a slower rate than the rate at which the series of pulses are supplied to the counter 71 by the frequency converter 65, the count in the counter 71 will rise until the pulse generator 75 produces pulses at the same rate as the pulses are received from the frequency converter 65. After the gate 63 has been turned off by the sequence controller 61, as described hereinabove, the count in the couner 71 will be reduced at a decreasing rate as the magnitude of the analogue signal across the RC timing circuit diminishes.

In the manner of operation explained above, the sequence controller 61 may advance the grinding machine 11 through a series of grinding sequences until the workpiece is ground to the desired size with the grinding wheel at the final position. Upon reaching the final position, the grinding machine 11 undergoes a final dwell period which is generally referred to as the "spark out" period, and when the "spark out" period is completed the sequence conroller 61 is actuated by the dwell timer 53 determining the "spark out" period to reset the grinding wheel to the retracted position for grinding another workpiece in the programmed grinding sequence.

To reset the grinding machine 11 for grinding another workpiece, the sequence controller 61 supplies an ON signal to the gate 63, to enable pulses to be supplied from the frequency converter 65 to the motor control circuit 67 for reversely rotating the motor 23. In the reset mode, pulses are supplied to the motor control circuit 67 at a relatively high frequency rate until the number of pulses supplied to the motor control circuit 67 equals the number of pulses used to advance the grinding wheel 15 during the preceding sequence of grinding movements. The pulses supplied to the motor control circuits 67 during the reset mode are also received by the control counter and compare circuits 69, and when the number of pulses equals the total pulses as represented by the signals from the feed range switches 51, the control counter and compare circuit 69 supplies a signal to the sequence controller 61 which in turn supplies an OFF signal to the gate 63 to prevent the passage of further pulses to the motor control circut 67. In addition, during the reset mode the sequence controller 61 supplies a retract signal to the rapid feed valve controller 19 so as to cause hydraulic fluid to be supplied to the forward end of the cylinder 29 to push the grinding wheel base 17 rearwardly to the retracted position. Upon reaching retracted position, another limit switch 77 is operated which supplies an enable signal to the start switch 55 to enable the start switch to subsequently supply another start signal to the rapid feed valve controller 19 if the grinding machine is properly reset as will be explained herein below.

In resetting the grinding machine 11, it is desirable that the grinding wheel 15 be returned the same distance to the initial position from which it was advanced by the grinding control circuit 25 during the preceding sequence of grinding movements. If the grinding wheel 15 is not reset a sufficient distance, then it may engage the workpiece during the next rapid feed movement, resulting in damage to the workpiece as well as possible injury to the operator. If the grinding wheel 15 is reset too great a distance, then the subsequent advancement of the grinding wheel 15 to a final position, as determined by the pulses supplied to the motor control circuit 67, will result in the workpiece not being ground to the desired size. This problem may occur due to an improper operation of the control circuit, the motor control circuit or even the motor. In the past, the proper resetting of the grinding wheel 15 was accomplished by always moving the grinding wheel 15 to a safe distance to prevent contact with the workpiece during the subsequent rapid feed movement, and by providing the grinding machine 11 with a suitable measuring instrument to monitor the actual size of the workpiece being ground. If the workpiece was not ground to the desired size at the completion of the sequence of grinding movements, the measuring instrument operated the sequence controller 61 to effect further feeding movement of the grinding wheel 15 until the workpiece was finally ground to the desired size as measured by the measuring instrument which thereupon supplied a reset signal to the sequence controller 61 to initiate the resetting of the grinding machine 11 as explained hereinabove.

In accordance with the present invention, the proper resetting of the grinding wheel 15 is determined without a measuring instrument monitoring the size of the workpiece by providing the grinding control circuit 25 with means to confirm the proper resetting of the grinding wheel 15 to an initial position in accordance with the pulses supplied to the motor control circuit 67 from the frequency converter 65. To determine that the feed screw 21 is being driven by the motor 23 in accordance with the series of pulses supplied to the motor control circuit 67, a pulse verification arrangement is provided whereby pulses are produced in accordance with the actual rotation of the feed screw. As shown, the pulse verification arrangement is in the form of a pulse generator 79 which is rotatably driven by the gear drive 22 for the feed screw 21 in accordance with the actual rotation of the feed screw 21. The verification pulse generator 79 may produce, in a conventional manner, a dual series of opposite pulses which lead or lag relative to each other in accordance with the direction of rotation of the feed screw 21. The verification pulses are received by a reset confirmation circuit 81 which detects the direction of rotation of the feed screw 21 and supplies pulses to a monitor counter and compare circuit 83 where the total number of pulses counted is compared with the total number of pulses indicated by the feed range switches 51. If the number of pulses counted by the monitor counter and compare circuit 83 is less than the number indicated by the feed range switches 51, the monitor counter and compare circuit 83 will supply an inhibit signal to the sequence controller 61 inhabiting the operation of the start switch 55 to prevent further operation of the grinding machine 11 to avoid a subsequent unsafe operation. If the number of pulses received by the monitor counter and compare circuit 83 equals the number of pulses indicated by the feed range switches 51 then the monitor counter and compare circuit 83 supplies a signal to the reset confirmation circuit 81 which, in a manner to be explained below, will supply a reset confirmation signal to the sequence controller 61 enabling further operation of the grinding machine 11. If the number of verification pulses exceeds the number of pulses indicated by the feed range switch, then the reset confirmation circuit 81 will not supply a reset confirmation signal to the sequence controller 61, but instead will energize an indicator light 84 to notify the operator that the grinding wheel has been over reset.

Since the number of verification pulses produced by the pulse generator 79 may not be precisely representative of the actual reset position of the grinding wheel 15 due to slack in the gear drive 22 or other difficulties, for example jitter, and since there is usually an acceptable margin of error in resetting the grinding machine 11, the reset confirmation circuit 81 is provided with means to accommodate a small margin of error in the number of verification pulses received from the verification pulse generator 79. For purpose of illustration only, it will be assumed that the acceptable margin of error in resetting the grinding machine 11 would be a distance within a range of 14 pulses. Furthermore, since the period of time necessary for the motor control circuit 67 to supply the final 15 pulses to the motor 23 may be accurately determined, the reset confirmation circuit 81 is provided with means to limit the pulses received within the margin of error to a predetermined time period.

In a reset operation according to the present invention, at the end of the "spark out" period the sequence controller 61 will supply signals to the control counter and compare circuit 69 and the monitor counter and compare circuit 83 to clear the counters, and then preload the monitor counter 83 with, for example, 8 pulses corresponding to the central number in the range of 15 pulses. Next, as explained above, the motor control circuit 67 is supplied with pulses in accordance with the total number of pulses indicated by the feed range switches 51, whereupon the control counter and compare circuit 69 will supply a signal to the sequence controller to cause an OFF signal to be supplied to the gate 63. In addition, the control counter and compare circuit 69 will supply an enabling signal to the reset confirmation circuit 81 to condition for operation a counter and limit detector 85 which forms a portion of the reset confirmation circuit 81. As the motor 23 is reversely driven to reset the grinding wheel 15, the verification pulses produced by the pulse generator 79 will lag the pulses produced by the frequency converter 65 due to the inherent delay in the operation of the motor control circuit 67, and accordingly, the counting of pulses by the monitor counter and compare circuit 83 will lag the counting of pulses by the control counter and compare circuit 69.

When the monitor counter and compare circuit 83 counts the same number of pulses indicated by the feed range switches 51, including the 8 pulses supplied to the counter 83 at the beginning of the reset operation, the monitor counter and compare circuit 83 will supply an actuating signal to the reset confirmation circuit 81 to initiate the operation of the counter and time limit detector 85 for counting any additional pulses received by the monitor counter and compare circuit 83. In addition, the actuating signal initiates a timer having a predetermined period of operation corresponding to the time necessary to receive the final 15 verification pulses. Accordingly, if the grinding machine 11 is reset precisely to the correct initial position, only 8 additional verification pulses will be counted within the time limit required to receive 15 pulses, and the reset confirmation circuit 81 will supply a reset confirmation signal to the sequence controller 61 enabling further operation of the grinding machine 11. Due to the margin of error provided by the reset confirmation circuit 81, the additional verification pulses counted by the counter and time limit detector 85 may range from 1 to 14 within the predetermined time limit and the reset confirmation circuit 81 will still supply a reset confirmation signal to the sequence controller 61. However, if 15 or more pulses are received within the predetermined time limit, then the reset confirmation circuit 81 will not supply a confirmation signal to the sequence controller 61 but instead will energize a light 84 to indicate an overreset condition of the grinding machine 11.

What is claimed is:

1. A machine tool control system comprising
   a machine element,
   means for advancing said machine element including a stepping motor, and
   means for supplying a selected number of pulses to said stepping motor to advance said machine element from a retracted position within a predetermined zone, defined by a predetermined number of pulses, to an advanced position,
   means for retracting said machine element including said stepping motor, and
   means for supplying said selected number of pulses at a predetermined rate to said stepping motor,
   reset confirmation means,
   means for supplying pulses, representative of the actual position of said machine element to said reset confirmation means as said machine element is retracted from said advanced position to said retracted position,
   timer means selectively set to time out after a time selected to correspond to the time required for said predetermined number of pulses plus one to be supplied to said reset confirmation means,
   means for energizing said timer means when said machine element has been retracted to the proximate edge of said zone,
   means for ascertaining whether said machine element is located within said zone when said timer times out, and
   means for disabling said advancing means
      when said machine element retraction terminates intermediate said advanced position and said proximate edge of the zone, or
      when said machine element retraction terminates beyond said zone.

2. A machine tool control system according to claim 1, further comprising
   means for advancing said machine element from a fully retracted position to said retracted position, and
   means for retracting said machine element from said retracted position to said fully retracted position.

3. A machine tool according to claim 1, further comprising means for resetting said timer means and enabling said advancing means when said machine element retraction terminates within said zone.

* * * * *